United States Patent
Almeida et al.

(10) Patent No.: US 11,706,468 B1
(45) Date of Patent: Jul. 18, 2023

(54) CPE MONITOR AND DATA COLLECTION WITH SIGNATURE-BASED EVENT ANALYSIS

(71) Applicant: CSC Holdings, LLC, Bethpage, NY (US)

(72) Inventors: Heitor J. Almeida, Yorktown Heights, NY (US); Pallavi Ghosh, Massapequa, NY (US); John Markowski, Smithtown, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

(21) Appl. No.: 17/139,654

(22) Filed: Dec. 31, 2020

(51) Int. Cl.
H04N 21/24 (2011.01)

(52) U.S. Cl.
CPC .................................. *H04N 21/24* (2013.01)

(58) Field of Classification Search
CPC ....................................................... H04N 21/24
See application file for complete search history.

(56) References Cited

U.S. PATENT DOCUMENTS

| | | | | |
|---|---|---|---|---|
| 2007/0076728 A1* | 4/2007 | Rieger | ..................... | H04L 47/12 370/401 |
| 2009/0030942 A1* | 1/2009 | Jiang | ................ | H04N 21/44209 |
| 2015/0146697 A1* | 5/2015 | Gibbon | ................ | H04B 17/382 370/336 |
| 2017/0359735 A1* | 12/2017 | Jain | ........................ | H04L 43/04 |
| 2018/0122340 A1* | 5/2018 | Kim | ....................... | G09G 5/026 |
| 2019/0028699 A1* | 1/2019 | Sharma | .............. | H04N 21/4425 |
| 2019/0037026 A1* | 1/2019 | Brooks | ............... | H04L 41/0896 |
| 2019/0307386 A1* | 10/2019 | Castillo | .............. | H04L 67/1004 |

* cited by examiner

*Primary Examiner* — Randy A Flynn
(74) *Attorney, Agent, or Firm* — Sterne, Kessler, Goldstein & Fox P.L.L.C

(57) ABSTRACT

Disclosed herein are system, method, and computer program product embodiments for collecting and analyzing data from customer premise equipment (CPEs) in a broadcasting network. An embodiment operates by a headend device establishing a first set of connections to a set of CPE devices, transmitting a set of CPE data collection instructions to each CPE device, and then terminating the first set of connections. Subsequently, the embodiment operates by the headend device establishing a second set of connections to the set of CPE devices and receiving, from a subset of the set of CPE devices, a set of CPE data packages generated based on set of CPE data collection instructions. The embodiment further operates by the headend device generating a CPE dataset based on the set of CPE data packages and determining a set of CPE diagnostic data for one or more CPE devices based on the CPE dataset.

27 Claims, 6 Drawing Sheets

CPE MONITOR AND DATA COLLECTION WITH SIGNATURE-BASED EVENT ANALYSIS

BACKGROUND

Customer premise equipment (CPEs) are devices configured to receive one-way communications from a headend server of a content provider via a broadcast signal. However, measurement of CPE health in any given network environment requires the collection of voluminous amounts of data. Further, for effective analysis or troubleshooting of CPEs, the collected data needs to be timely, reliable, and complete. As the number of CPEs per environment has increased to millions of CPEs, the collected payloads have become bigger in size and could potentially harm the network.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
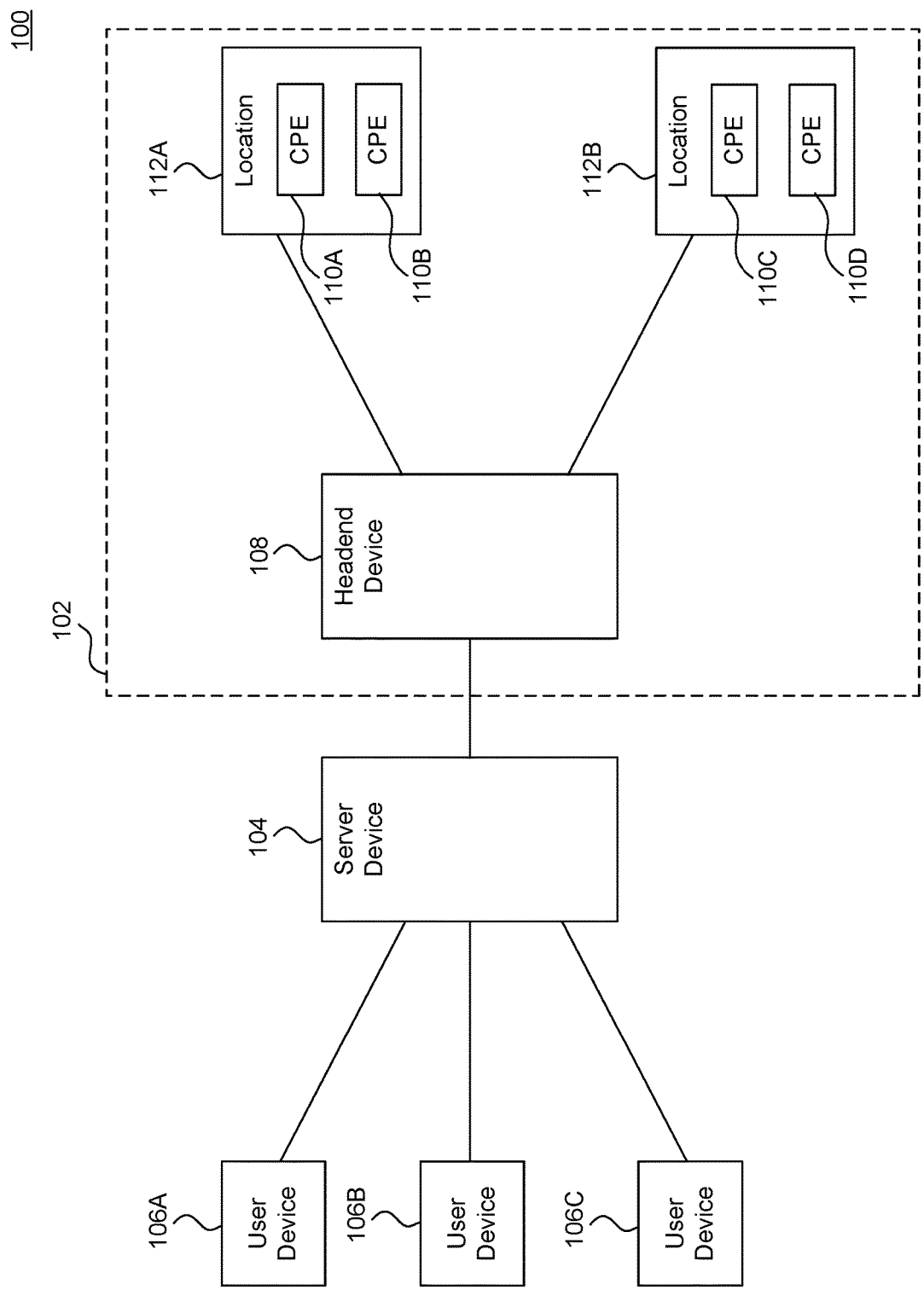
FIG. 1 is a block diagram of an example communication system for collecting and analyzing data from CPE devices in a network environment, according to some embodiments.

Provided herein are system, apparatus, device, method and/or computer program product embodiments, and/or combinations and sub-combinations thereof (collectively referred to generally as "an embodiment," "the embodiment," "one embodiment," etc.), for collecting and analyzing data from customer premise equipment (CPE) devices in network environment such as a broadcasting network. Provided further herein are system, apparatus, device, method and/or computer program product embodiments, and/or combinations and sub-combinations thereof, for CPE monitoring and data collection with signature-based event analysis. As referred to herein, the terms "CPE" and "CPE device" can include, but are not limited to, devices such as set-top boxes, residential gateways, network switches, networking adapters, routers, Internet-access gateways, telephones, any other suitable devices, and any combinations thereof that enable customers to access content providers' communication services.

The system, apparatus, device, method and/or computer program product embodiments, and/or combinations and sub-combinations thereof, described herein provide for collecting and analyzing an enormous amount of data in a network-efficient manner, capturing snapshots of millions of CPE devices in any network environment, portable to any type of platform. This data, referred to herein as "CPE data," provides an instant snapshot or historical view of a CPE device, a selected group of CPE devices, or the entire network environment. Further, by combining all relevant logs, configuration files, and real-time executed instruction sets, among other data and electronic information, the collected CPE data is more timely, reliable, and complete in nature. As a result, an embodiment described herein can utilize the collected CPE data for evaluating overall connectivity, CPE performance (e.g., performance characteristics), quality of service (QoS), levels of user impact, troubleshooting and business data, issue locations, maps (e.g., topographic maps, heat maps), and many other evaluations.

In one example, the large size and types of data included in the collected CPE data can make it challenging to process by a computing system such as a headend device. For instance, the collected CPE data can vary significantly with platform type, code versions, and regions. In some aspects, an embodiment described herein provides techniques to digest this multivariate data, find the right set of signatures, and provide analyses of different CPE types on the same solution.

In some aspects, an embodiment can use a parallel, distributed process to launch simultaneous connections (e.g., at an hourly, daily, or weekly frequency) with thousands of CPE devices, scalable to hundreds of thousands and even millions of CPE devices, and initiate data collection from these CPE devices. In some aspects, an embodiment described herein can provide instructions to each CPE device on the first connection, and then collect the output (e.g., the results of the execution of those instructions by the CPE device) on a subsequent connection. In some aspects, rather than continuing the connections to the CPE devices and waiting for their payloads of CPE data, an embodiment described herein can allow each CPE device to execute the set of instructions and prepare its output of CPE data. Since all CPE devices can perform these actions at about the same time, the overall collected CPE data is similarly timed (e.g., corresponding to a substantially similar timeframe). Then, a respective application executing in each CPE device can utilize the maximum lossless compression level as provided by the CPE device to prepare a compressed package of CPE data and thereby reduce unnecessary traffic in the network environment.

In some aspects, the system, apparatus, device, method and/or computer program product embodiments, and/or combinations and sub-combinations thereof, described herein can incorporate specialized methods of data collection based on the nature of the CPE data. For instance, the system, apparatus, device, method and/or computer program product embodiments, and/or combinations and sub-combinations thereof, described herein can index some data as time series; gather critical data with the precaution of minimal user impact or substantially no user impact; collect most KPI data in real time; and, if real-time KPI data is absent, select KPI data stored on the CPE.

In some aspects, to reduce or substantially avoid any potential continuous or repetitive connections from the headend device to the CPE devices, the system, apparatus, device, method and/or computer program product embodiments, and/or combinations and sub-combinations thereof, described herein can randomize the input list of CPE devices at every execution. As a result, the collected CPE data can provide snapshot of n number of CPE devices almost at a given time (e.g., within a close range of time).

In some aspects, after the first successful connection to a CPE device, the system, apparatus, device, method and/or computer program product embodiments, and/or combinations and sub-combinations thereof, described herein can calculate the average time for the next connection to that CPE device (e.g., based on past CPE performance, the state of the CPE device, and the state of the network environment). In some aspects, at the second connection to the CPE device, an embodiment described herein can check if the package of CPE data is complete or not. In the absence of CPE device connectivity or a complete package of CPE data, an embodiment described herein can retrofit themselves to perform a number of connection retries and determine a duration between each retry, therefore offering multiple chances to each CPE device for data collection. In some aspects, once the data collection is complete, an embodiment described herein can perform data storage and processing with a highly optimized in-memory technique allowing for quick retrieval of data.

In some aspects, an embodiment described herein can first process data from each CPE device individually. In some aspects, an embodiment described herein can then use a combination of back-end systems data and CPE intrinsic data to differentiate CPE device types and accordingly adjust the data digestion mechanism.

In some aspects, an embodiment described herein can perform a continuous exploration and feedback process to build signatures for detecting an event. As referred to herein, an "event" can be an issue, a change in profile data, the launching of an app or channel, an action by a remote control, a KPI change status, or any other suitable event. In some aspects, an embodiment described herein can identify and validate true signatures from customer call logs and testing.

In some aspects, an embodiment described herein can select the key factors needed to determine an event and assign each factor a respective weight. In some aspects, an embodiment described herein can perform correlational analyses using various data sources for event detection. Over time, these event detection techniques can be evolved to predict one or more events.

There are many exemplary aspects to the system, apparatus, device, method and/or computer program product embodiments, and/or combinations and sub-combinations thereof, disclosed herein. For example, embodiments of the present disclosure provide for gathering similarly-timed data from all CPE devices in a network environment, which can include millions of CPE devices. In another example, embodiments of the present disclosure provide for extracting different grades of data from the collected CPE data. As a result of these and other embodiments described herein, large volumes of CPE data can be collected and analyzed with substantially no harm to the network and reduced impact on network bandwidth.

FIG. 1 illustrates a block diagram of an example system 100 for collecting and analyzing data from CPE devices 110A-D in a network environment 102 (e.g., a broadcasting network). As shown in FIG. 1, network environment 102 includes headend device 108 and one or more CPE devices 110A-D. System 100 further includes server device 104 and one or more user devices 106A-C. Although server device 104 and headend device 108 are illustrated in FIG. 1 as separate devices, in some embodiments, the structures, functionalities, or both of server device 104 and headend device 108 may be combined to be, or to function as, a single device. As such, where headend device 108 is referred to in this disclosure, a person skilled in the art would readily understand that the same applies to the combined device.

Network environment 102, server device 104, and user devices 106A-C can be managed by the same entity or different entities. In some aspects, for example, network environment 102, server device 104, and user devices 106A-C can be managed by a single entity, such as a cable provider. In other aspects, network environment 102, server device 104, and user devices 106A-C can be managed by different entities. For example, network environment 102 may be managed by a cable provider, whereas server device 104 and user devices 106A-C may be managed by a third-party entity and have the capability to correct issues in the cable provider's network environment 102.

Headend device 108 can transmit CPE data collection instructions, programming content, diagnostic and trouble-shooting instructions, software and firmware updates, and other electronic information to CPE devices 110A-D using a variety of techniques. In one example, headend device 108 may send the CPE data collection instructions to CPE devices 110A-D on predetermined intervals (e.g., weekly, daily, or hourly). In another example, headend device 108 may send the CPE data collection instructions to specific CPE devices 110A-D. In yet another example, headend device 108 may send the CPE data collection instructions to CPE devices 110A-D on the same tap or fiber node, or on different taps or fiber nodes. In still another example, headend device 108 may send the CPE data collection instructions to a number of CPE devices 110A-D on a random basis. For instance, on a first day, headend device 108 may randomly send the CPE data collection instructions to CPE devices 110A, 110C, and 110D (but not 110B), and then headend device 108 may randomly send the CPE data collection instructions to CPE devices 110A, 110B, and 110D (but not 110C) on a second day. In a further example, headend device 108 may send the CPE data collection instructions to some or all CPE devices 110A-D in network environment 102 at the same time (e.g., substantially simultaneously) or at different times.

CPE devices 110A-D may include, but are not limited to, one or more set-top boxes, residential gateways, network switches, networking adapters, routers, Internet-access gateways, telephones, any other suitable devices, and any combinations thereof. For example, CPE devices 110A-D may include over 1,000,000 CPE devices. In some aspects, CPE devices 110A-D can be two-way communication devices. As such, CPE devices 110A-D can receive programming data, CPE data collection instructions, and other electronic information from headend device 108, as well as send the results of the executed CPE data collection instructions back to headend device 108. CPE devices 110A-D have processing circuitry and memory for executing the set of CPE data collection instructions and preparing (e.g., generating and compressing) CPE data packages. In some aspect, an application executing in each CPE device 110A-D can utilize the maximum lossless compression level as provided by that CPE device 110A-D and prepare a compressed CPE data package to reduce unnecessary traffic on network environment 102.

For purposes of illustration, CPE devices 110A-D may be located at various geographical locations, such as geographical locations 112A and 112B. Geographical locations 112A and 112B may include any physical structures, such as a place of business, a residence, a neighborhood, or a multi-unit entity such as a hospital, school, office complex, or apartment building. Accordingly, in some embodiments, a particular geographical location 112A or 112B may include one or more CPE devices from among CPE devices 110A-D. Although FIG. 1 illustrates network environment 102 as having CPE devices 110A-D located at geographical locations 112A and 112B, those skilled in the relevant art(s) will recognize that the disclosure herein is equally applicable to network environments having more or less CPE devices (e.g., millions of CPE devices) and/or more or less geographical locations without departing from the spirit and scope of the present disclosure.

In one illustrative example, system 100 can provide for CPE monitoring and data collection with signature-based event analysis. System 100 can utilize a parallel, distributed process to launch simultaneous connections with multiple CPE devices 110A-D (e.g., STBs, gateway devices, etc.), scalable to hundreds of thousands and even millions of CPE devices 110A-D, to initiate data collection. System 100 can inject a set of instructions into each CPE device 110A-D during an initial connection and, rather than staying connected and waiting for the results, system 100 can collect, or attempt to collect, the output from each CPE device 110A-D on a subsequent connection. System 100 can use data collected upon the first connection to CPE devices 110A-D, such as network availability and the perceived health of each CPE device 110A-D, to calculate one or more optimal times for the next connection to each CPE device 110A-D, thereby eliminating any waiting time. Moreover, system 100 can spread the connections to CPE devices 110A-D across network environment 102, avoiding any over-taxing on any particular portions (e.g., nodes) of network environment 102. In some aspects, the disclosed data collection techniques may allow much more information to be collected from many more CPE devices 110A-D over a substantially shorter period of time, which may further allow for substantially better diagnosis of problems and issues of CPE devices 110A-D and network environment 102.

Figure 2:
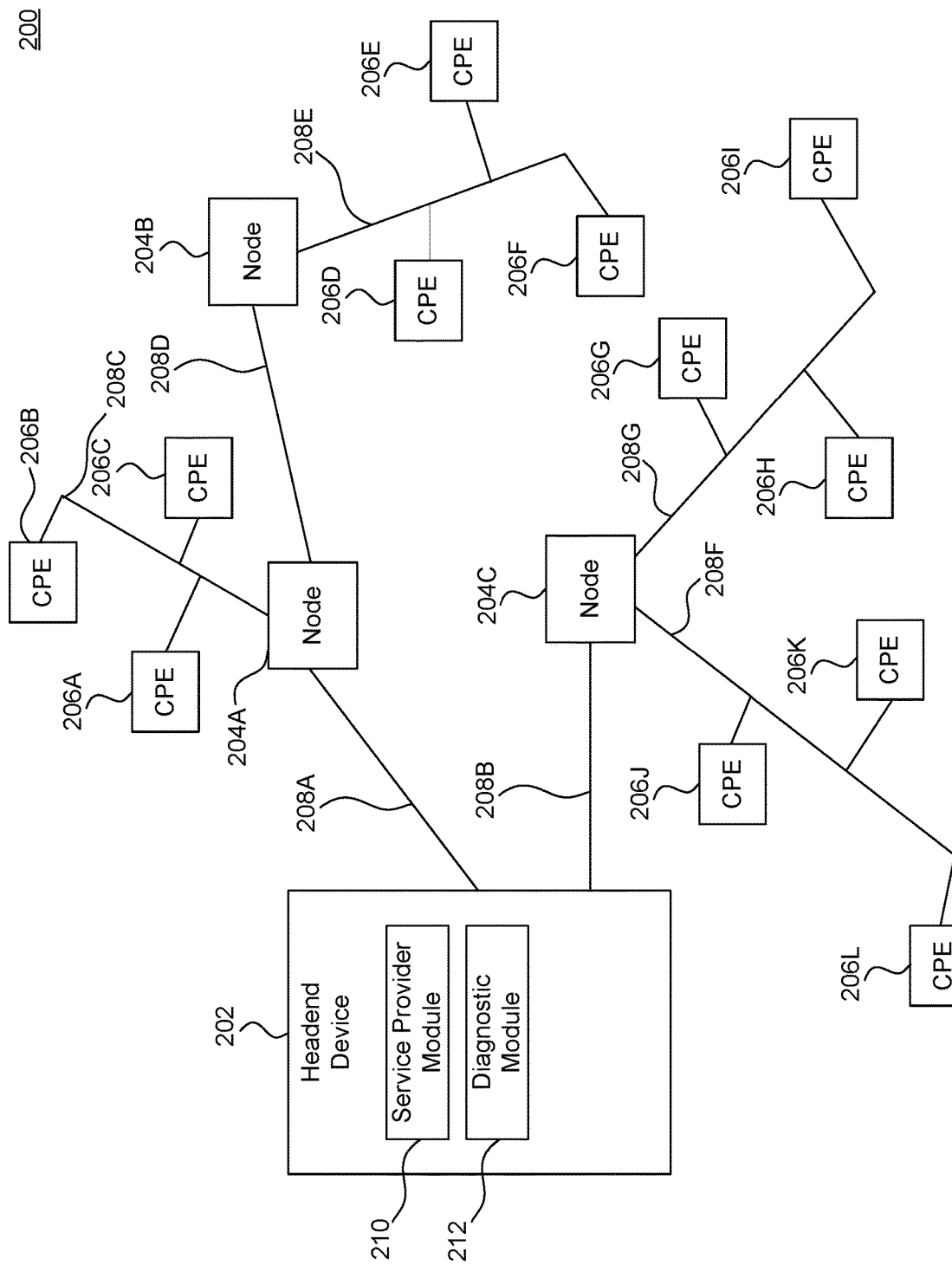
FIG. 2 is a block diagram of a portion of an example network environment, according to some embodiments.

FIG. 2 illustrates a block diagram of an example network environment 200 for collecting and analyzing data from CPE devices 206A-L. In some embodiments, network environment 200 may be managed by a cable provider. Network environment 200 can include headend device 202, nodes 204A-C (e.g., fiber nodes), CPE devices 206A-L, cables 208A-B (e.g., coaxial or fiber cables), and cables 208C-G (e.g., coaxial cables). Headend device 202 can transmit CPE data collection instructions to, and receive CPE data packages from, CPE devices 206A-L via cables 208A-G.

Headend device 202 includes service provider module 210 and diagnostic module 212 for providing programming content and CPE data collection instructions, receiving CPE data packages, generating CPE datasets, and determining CPE diagnostic data. Service provider module 210 provides programming data to CPE devices 206A-L. Diagnostic module 212 provides CPE data collection instructions to CPE devices 206A-L, receives CPE data packages from CPE devices 206A-L (e.g., in response to execution of the CPE data collection instructions by CPE devices 206A-L), generates CPE datasets based on the CPE data packages, and determines CPE diagnostic data based on the CPE dataset.

In some aspects, nodes 204A-C may receive CPE data collection instructions directly from headend device 202. Alternatively, one or more of nodes 204A-C may receive CPE data collection instructions indirectly from headend device 202, such as from another node (e.g., node 204A). In some aspects, nodes 204A-C may receive CPE data packages directly from CPE devices 206A-L. Alternatively, one or more of nodes 204A-C may receive CPE data packages indirectly from CPE devices 206A-L, such as from another node (e.g., node 204B).

In some aspects, the CPE data collection instructions may specify the type of performance characteristics for CPE devices 206A-L to collect and package together. As such, the CPE data collection instructions can include a request for a specific performance characteristic or a group of performance characteristics. The performance characteristics can relate to CPE devices 206A-L themselves or other components within network environment 200 (e.g., headend device 202, nodes 204A-C, and/or cables 208A-G).

In some aspects, the performance characteristics may relate to signal issues caused by or related to a particular CPE device 206A-L. For example, a geographical location having a particular CPE device 206A-L may have faulty wiring or components (e.g., a splitter and/or an amplifier), and the performance characteristics may relate to a component failure of a CPE device 206A-L. In another example, a CPU and/or a memory of CPE devices 206A-L may be overwhelmed or overutilized, thereby causing signal issues. In yet another, the performance characteristics may also relate to signal issues caused by a service drop resulting from, for example, the connection between headend device 202 and a particular node 204A-C, and/or the connection between a particular node 204A-C and a particular CPE device 206A-L. In still another example, the performance characteristics may relate to signal quality, signal strength, and/or signal-to-noise ratio and thus may include timing data, frequency data, level data, message contents, and any other suitable data.

In some aspects, after receiving the performance characteristics from CPE devices 206A-L, headend device 202 can perform an analysis of the performance characteristics, such as by comparing the performance characteristics of a particular CPE device 206A-L to a specification standard (e.g., establishing minimum standards) and/or to the performance characteristics of one or more other CPE devices 206A-L (including, but not limited to, an average thereof). Headend device 202 can then determine if the particular CPE device 206A-L's performance characteristic is outside of specified limits provided in the specification standard and/or exceeds one or more other CPE device 206A-L's performance characteristics by a predetermined amount.

Based on the analysis of the performance characteristics, headend device 202 may determine if there is an issue in network environment 200. For example, if the particular CPE device 206A-L's performance characteristic exceeds the specified limit provided in the specifications or the predetermined amount of one or more other CPE device 206A-L's performance characteristics, headend device 202 may detect the presence of an issue in network environment 200. The issue may relate to a component of network environment 200 (e.g., headend device 202, nodes 204A-C, CPE devices 206A-L, and/or cables 208A-G). After detecting the presence of the issue, headend device 202 identifies a relative or precise geographical location of the issue in network environment 200. To do so, in some embodiments, headend device 202 can include, or have access to, a map of network environment 200. In some embodiments, the map may be a topographical map whose topology may include the geographical location of all components, as well as the distance and/or interconnectivity between them, in network environment 200. Accordingly, headend device 202 may determine a precise geographical location of the component in network environment 200 causing the issue. As such, headend device 202 may determine that the issue relates to one or more of headend device 202, nodes 204A-C, CPE devices 206A-L, and/or cables 208A-G.

Further, in some embodiments, to determine a relative geographical location of the issue in network environment 200, headend device 202 may send synchronization messages to CPE devices 206A-L, including the particular CPE devices 206A-L having issues. The synchronization messages may be sent at the same or different times. After a period of time, headend device 202 may receive a response from CPE devices 206A-L. Headend device 202 then determines a response time from CPE devices 206A-L. Based on the response time, headend device 202 determines a search area of any shape (e.g., a circle) and distance extending from headend device 202. As such, headend device 202 may determine that CPE devices 206A-L having response times longer than the longest time of the particular CPE devices 206A-L having issues may be outside the search area. In contrast, headend device 202 may determine that CPE devices 206A-L having response times shorter than the longest time of the particular CPE devices 206A-L having issues may be inside of the search area. By operating in such a fashion, only components within the search area need to be inspected by headend device 202.

After identifying the precise or relative geographical location of the issue in network environment 200, headend device 202 may update an existing map, or create a new map, of network environment 200. The map may include a known or relative geographical location of all known components and interconnection between them. The map may also include a known or relative geographical location of the issue. In some embodiments, the map may include contrasting colors indicating possible geographical locations for the issue.

In some aspects, headend device 202 can transmit the information relating to the issue (e.g., a map illustrating the issue) to user devices (e.g., user devices 106A-C shown in FIG. 1) via a server device (e.g., server device 104 shown in FIG. 1) to permit corrective actions to be taken. In some embodiments, different users may be authorized or responsible for troubleshooting different geographical areas. In some embodiments, the users may be service technicians assigned to the geographical location. In some embodiments, the users may be operators who send a service technician to a particular geographical location (e.g., the precise or relative geographical location) to determine the issue and/or remedy the issue. As such, based on a particular geographical location of the issue, the information relating to the issue can be sent to the appropriate user device to notify the appropriate user of the issue. This process may be performed in real-time or near real-time, for example, while programming data and additional CPE data collection instructions are being provided to CPE devices 206A-L. As such, CPE devices 206A-L may be provided with continued and uninterrupted service.

Figure 3:
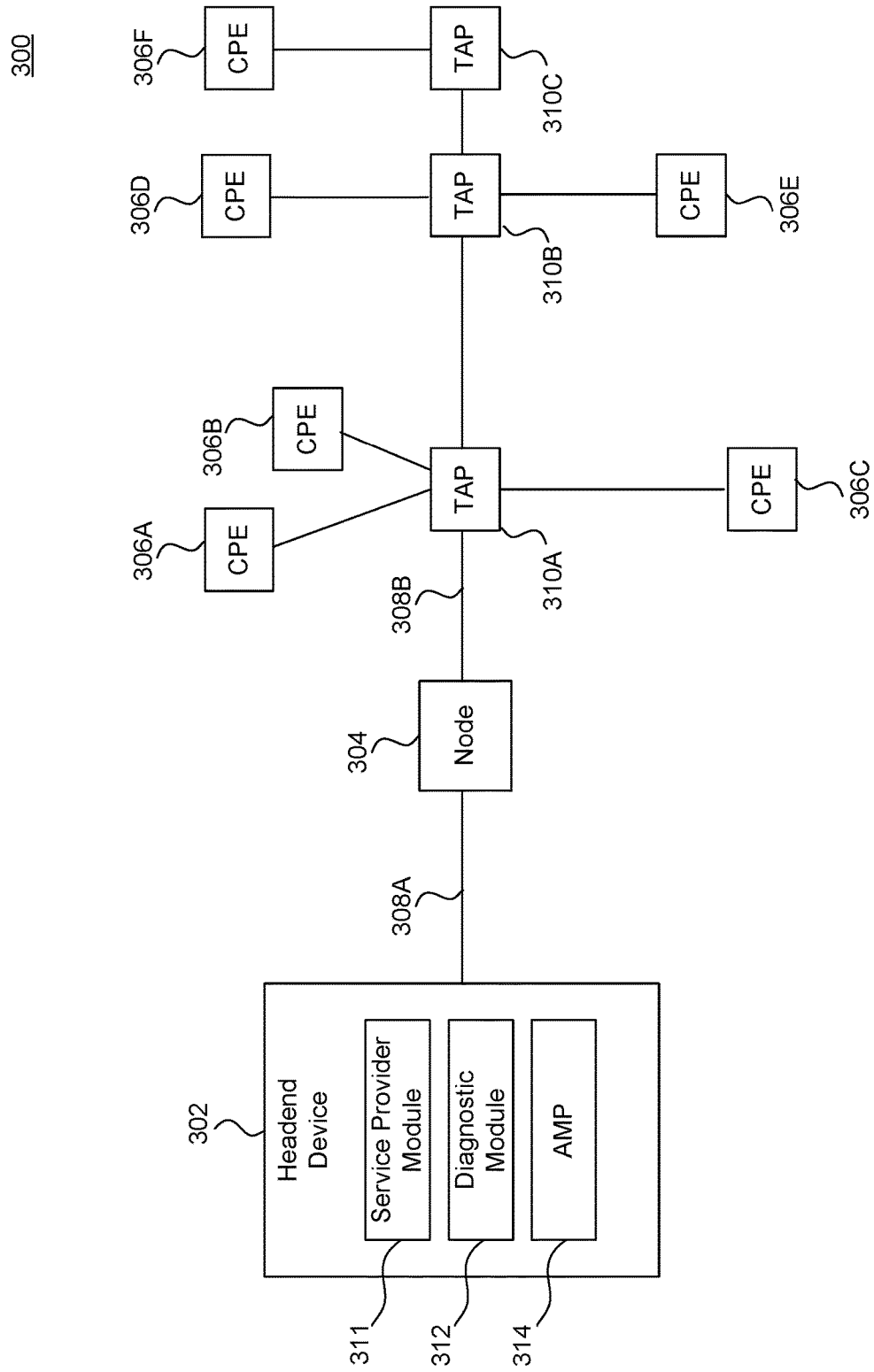
FIG. 3 is a block diagram of a portion of another example network environment, according to some embodiments.

FIG. 3 illustrates a block diagram of an example network environment 300 for collecting and analyzing data from CPE devices 306A-F. In some embodiments, network environment 300 may be managed by a cable provider. Further, network environment 300 can include headend device 302, node 304 (e.g., a fiber node), CPE devices 306A-F, cable 308A (e.g., a coaxial or fiber cable), and cable 308B (e.g., a coaxial cable). Headend device 302 can transmit CPE data collection instructions to, and receive CPE data packages from, CPE devices 306A-F via cables 308A-B.

Network environment 300 further includes one or more taps 310A-C and amplifier 314. Taps 310A-C are passive and relay data and electronic information to one or more CPE devices 306A-F from headend device 302 via cables 308A-B. Accordingly, taps 310A-C may support multiple CPE devices 306A-F, which may be different distances away from taps 310A-C and may belong to the same or different geographical locations. Thus, cables 308A-B may have one or more taps 310A-C that relay data and electronic information to one or more geographical locations having one or more CPE devices 306A-F. Further, amplifier 314 amplifies signals provided by headend device 302 and/or node 304. In some embodiments, amplifier 314 may be part of headend device 302. In other embodiments, amplifier 314 may be part of a cable (e.g., cable 308A, cable 308B, or both) connected to node 304. A person skilled in the art would readily realize that any number of amplifiers may be provided in network environment 300.

Headend device 302 includes service provider module 311 and diagnostic module 312 for providing programming content and CPE data collection instructions, receiving CPE data packages, generating CPE datasets, and determining CPE diagnostic data. Service provider module 311 provides programming data to CPE devices 306A-F. Diagnostic module 312 provides CPE data collection instructions to CPE devices 306A-F, receives CPE data packages from CPE devices 306A-F (e.g., in response to execution of the CPE data collection instructions by CPE devices 306A-F), generates CPE datasets based on the CPE data packages, and determines CPE diagnostic data based on the CPE dataset.

In some aspects, the CPE data collection instructions may specify the type of performance characteristics for CPE devices 306A-F to collect and package together. As such, the CPE data collection instructions can include a request for a specific performance characteristic or a group of performance characteristics. The performance characteristics can relate to CPE devices 306A-F themselves or other components within network environment 300 (e.g., headend device 302, node 304, cables 308A-B, taps 310A-C, and/or amplifier 314).

In some aspects, the performance characteristics may relate to signal issues caused by or related to a particular CPE device 306A-F. For example, a geographical location having a particular CPE device 306A-F may have faulty wiring or components (e.g., a splitter and/or an amplifier), and the performance characteristics may relate to a component failure of a CPE device 306A-F. In another example, a CPU and/or a memory of CPE devices 306A-F may be overwhelmed or overutilized, thereby causing signal issues. In yet another example, the performance characteristics may also relate to signal issues caused by a service drop resulting from, for example, the connection between headend device 302 and a particular node 304, the connection between a particular node 304 and a particular tap 310A-C, and/or the connection between a particular tap 310A-C and a particular CPE device 306A-F. In still another example, the performance characteristics may relate to signal quality, signal strength, and/or signal-to-noise ratio and thus may include timing data, frequency data, level data, message contents, and any other suitable data.

In some aspects, after receiving the performance characteristics from CPE devices 306A-F, headend device 302 can perform an analysis of the performance characteristics, such as by comparing the performance characteristics of a particular CPE device 306A-F to a specification standard (e.g., establishing minimum standards) and/or to the performance characteristics of one or more other CPE devices 306A-F (including, but not limited to, an average thereof). Headend device 302 can then determine if the particular CPE device 306A-F's performance characteristic is outside of specified limits provided in the specification standard and/or exceeds one or more other CPE device 306A-F's performance characteristics by a predetermined amount.

Based on the analysis of the performance characteristics, headend device 302 may determine if there is an issue in network environment 300. For example, if the particular CPE device 306A-F's performance characteristic exceeds the specified limit provided in the specifications or the predetermined amount of one or more other CPE device 306A-F's performance characteristics, headend device 302 may detect the presence of an issue in network environment 300. The issue may relate to a component of network environment 300 (e.g., headend device 302, node 304, CPE devices 306A-F, cables 308A-B, taps 310A-C, and/or amplifier 314). After detecting the presence of the issue, headend device 302 identifies a relative or precise geographical location of the issue in network environment 300. To do so, in some embodiments, headend device 302 can include, or have access to, a map of network environment 300. In some embodiments, the map may be a topographical map whose topology may include the geographical location of all components, as well as the distance and/or interconnectivity between them, in network environment 300. Accordingly, headend device 302 may determine a precise geographical location of the component in network environment 300 causing the issue. As such, headend device 302 may determine that the issue relates to one or more of headend device 302, node 304, CPE devices 306A-F, cables 308A-B, taps 310A-C, and/or amplifier 314.

In some aspects, the topographical map of network environment 300 may include the geographical location of some components and/or their interconnectivity. As a result, headend device 302 may be unaware of the geographical location and/or connectivity of some components in network environment 300. For example, headend device 302 may know the geographical location of taps 310A-C and their interconnection with CPE devices 306A-F (e.g., tap 310A is connected to 306A-C). As such, if headend device 302 determines that CPE devices 306D-G have an issue and that CPE devices 306A-C do not have an issue, headend device 302 can determines that the issue is between taps 310A and 310C. By operating in such a fashion, headend device 302 may only need to inspect components between taps 310A and 310C.

In other aspects, headend device 302 may know the geographical location of headend device 302 and/or nodes as well as the interconnectivity between headend device 302 and node 304. However, headend device 302 may not be aware of the geographical location of taps 310A-C. Accordingly, upon detection of the presence of an issue relating to a particular CPE device 306A-C, to identify possible issues relating to taps 310A-C and amplifier 314, headend device 302 can specify a search area of any shape (e.g., a circle) and distance from the particular CPE device 306A-C. Headend device 302 then may exclude taps 310A-C and amplifiers outside of the search area, regardless of whether taps 310A-C and amplifier 314 are associated with the same or different node 304 as the particular CPE device 306A-C. Headend device 302 may also exclude taps 310A-C and amplifiers inside of the search area connected to a different node 304. By operating in such a fashion, headend device 302 may only need to inspect taps 310A-C and amplifiers within the search area and associated with the same node 304 as the CPE device 306A-C having the issue.

Further, in some embodiments, to determine a relative geographical location of the issue in network environment 300, headend device 302 may send synchronization messages to CPE devices 306A-F, including the particular CPE devices 306A-F having issues. The synchronization messages may be sent at the same or different times. After a period of time, headend device 302 may receive a response from CPE devices 306A-F. Headend device 302 then determines a response time from CPE devices 306A-F. Based on the response time, headend device 302 determines a search area of any shape (e.g., a circle) and distance extending from headend device 302. As such, headend device 302 may determine that CPE devices 306A-F having response times longer than the longest time of the particular CPE devices 306A-F having issues may be outside the search area. In contrast, headend device 302 may determine that CPE devices 306A-F having response times shorter than the longest time of the particular CPE devices 306A-F having issues may be inside of the search area. By operating in such a fashion, only components within the search area need to be inspected by headend device 302.

After identifying the precise or relative geographical location of the issue in network environment 300, headend device 302 may update an existing map, or create a new map, of network environment 300. The map may include a known or relative geographical location of all known components and interconnection between them. The map may also include a known or relative geographical location of the issue. In some embodiments, the map may include contrasting colors indicating possible geographical locations for the issue.

In some aspects, headend device 302 can transmit the information relating to the issue (e.g., a map illustrating the issue) to user devices (e.g., user devices 106A-C shown in FIG. 1) via a server device (e.g., server device 104 shown in FIG. 1) to permit corrective actions to be taken. In some embodiments, different users may be authorized or responsible for troubleshooting different geographical areas. In some embodiments, the users may be service technicians assigned to the geographical location. In some embodiments, the users may be operators who send a service technician to a particular geographical location (e.g., the precise or relative geographical location) to determine the issue and/or remedy the issue. As such, based on a particular geographical location of the issue, the information relating to the issue can be sent to the appropriate user device to notify the appropriate user of the issue. This process may be performed in real-time or near real-time, for example, while programming data and additional CPE data collection instructions are being provided to CPE devices 306A-F. As such, CPE devices 306A-F may be provided with continued and uninterrupted service.

Figure 4:
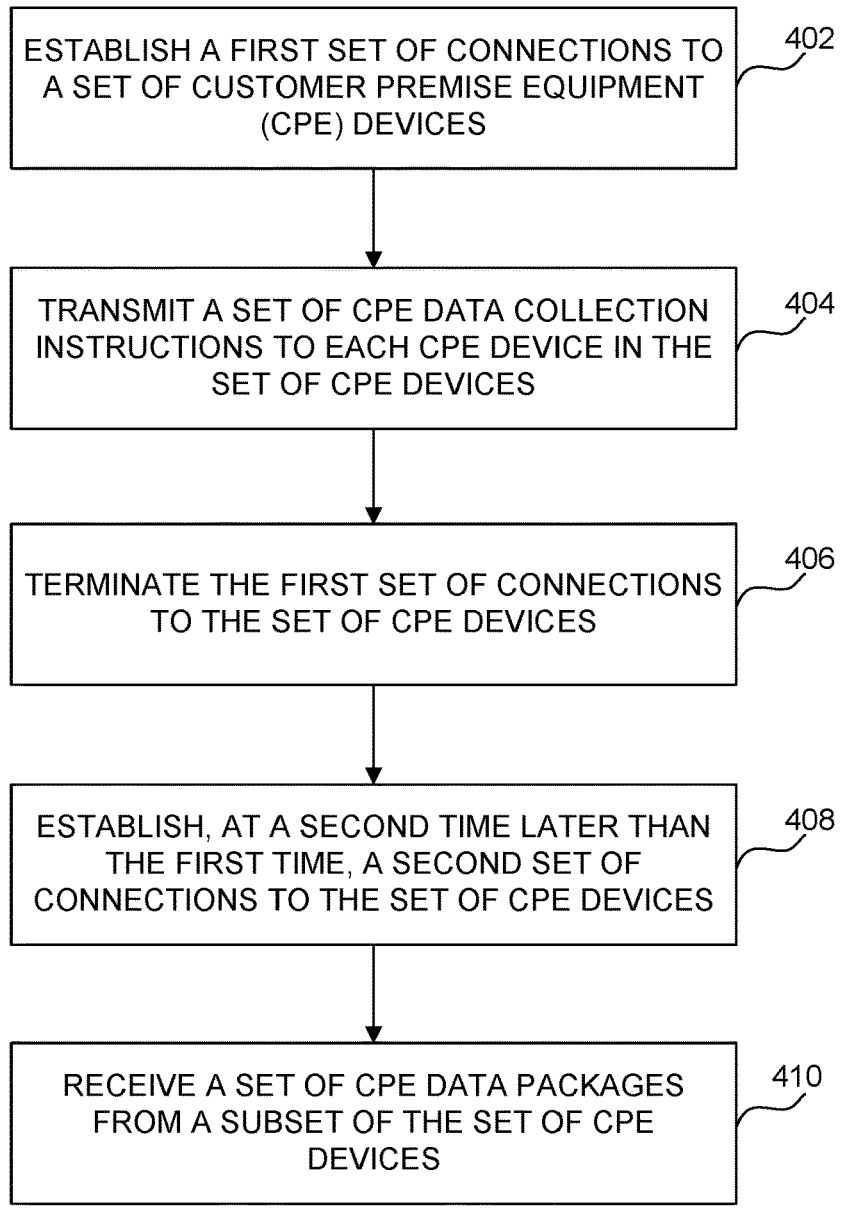
FIG. 4 is a block diagram of an example method for collecting data from CPE devices in a network environment, according to some embodiments.

FIG. 4 is a flowchart for an example method 400 for collecting data from CPE devices in a network environment. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 4, as will be understood by a person of ordinary skill in the art.

Method 400 shall be described with reference to the example embodiment of FIG. 1. However, method 400 is not limited to that example embodiment. For example, method 400 may be described with reference to FIG. 1, FIG. 2, FIG. 3, FIG. 6, or any combination thereof.

At 402, headend device 108 establishes, during a first timeframe, a first set of connections to a set of CPE devices, such as CPE devices 110A-D. The set of CPE devices can include one or more set-top boxes, residential gateways, network switches, networking adapters, routers, Internet-access gateways, telephones, any other suitable devices, and any combinations thereof. For example, the set of CPE devices can include over about 1,000,000 CPE devices. In some aspects, headend device 108 can utilize a parallel, distributed process to launch substantially simultaneous connections with thousands to millions of CPE devices. In some aspects, to reduce or substantially avoid any potential continuous or repetitive connections from headend device 108 to the set of CPE devices, headend device 108 can be configured to randomize the input list of n CPE devices at every execution of 402, where n refers to an integer value greater than or equal to one. As a result, the collected CPE data can provide snapshot of n random CPE devices at a given time or within a substantially narrow range of time.

At 404, headend device 108 transmits a set of CPE data collection instructions to each CPE device in the set of CPE devices based on the first set of connections. The set of CPE data collection instructions can include electronic instructions for each CPE device to generate a respective CPE data package and compress the CPE data package at a maximum lossless compression level of the respective CPE device. In some aspects, the electronic instructions included in the set of CPE data collection instructions can further instruct each CPE device to generate a respective CPE data package by incorporating specialized techniques based on the nature of data. For example, the electronic instructions can instruct each CPE device to index some data as time series; gather critical data with the precaution of minimal user impact or substantially no user impact; collect most KPI data in real time; and, if real-time KPI data is absent, select stored data on the CPE device.

At 406, headend device 108 terminates, allows to time out, or otherwise discontinues the first set of connections to the set of CPE devices. For example, rather than continuing the connections to the CPE devices and waiting for the set of CPE data packages, headend device 108 can allow each CPE to execute the set of CPE data collection instructions and prepare its respective CPE data package. As each CPE device in the set of CPE devices can prepare its respective CPE data package in substantially the same timeframe, the overall set of CPE data packages can be similarly timed (e.g., corresponding to a substantially similar timeframe). Then, an application executing in each CPE device can utilize the maximum lossless compression level as provided by the CPE device and prepare a compressed CPE data package to reduce unnecessary traffic on network environment 102.

At 408, headend device 108 establishes, during a second timeframe later than the first timeframe, a second set of connections to the set of CPE devices. In some aspects, after the first successful connection to a CPE device at 402, headend device 108 can calculate the average time for attempting to establish the next connection to that CPE device at 408. In some aspects, at 408, headend device 108 can be configured to check if each CPE data package is complete or not. In the absence of connectivity or a complete CPE data package, headend device 108 can retrofit itself to perform a number of connection retries and determine a duration between each retry, therefore offering multiple chances for data collection from each CPE device.

At 410, headend device 108 receives a set of CPE data packages from a subset of the set of CPE devices based on the second set of connections. The subset of the set of CPE devices can include between one and all of the CPE devices in the set of CPE devices. For example, the subset of the set of CPE devices can include over about 100,000 CPE devices or, in some aspects, over about 1,000,000 CPE devices. Additionally or alternatively, the subset of the set of CPE devices can include a first CPE device and a second CPE device that is different in type from the first CPE device. For example, the first CPE device can include a set-top box, and the second CPE device can include a gateway device.

In some aspects, each CPE data package in the set of CPE data packages may have been generated by a respective CPE device in the subset of the set of CPE devices based on the set of CPE data collection instructions. For example, each CPE device in the subset of the set of CPE devices can have the capability to compress data at a maximum lossless compression level, the set of CPE data packages can include a set of compressed CPE data packages, and each compressed CPE data package in the set of compressed CPE data packages can be compressed by a respective CPE device in the subset of the set of CPE devices at the maximum lossless compression level of that respective CPE device.

In some aspects, the set of CPE data packages can include terabytes of data including snapshots (e.g., instant snapshots, historical views, or a combination thereof) of millions of CPE devices in network environment 102, portable to any type of platform. For example, the set of CPE data packages can include: logs; configuration files; real-time executed instruction sets; performance characteristics; KPI data; result sets of linux commands that provide details on performance, connectivity, profiling, and other suitable parameters; time series data for one or more selected parameters; output of CPE-specific middleware commands; additional information that could help provide, or derive, business insights or KPIs; any other suitable data; or any combinations thereof. In another example, the set of CPE data packages can include two to three months of raw data or over one year of KPI reports. Additionally or alternatively, the set of CPE data packages can vary with platform type, code versions, and regions. Headend device 108 can be configured to digest this multivariate data, find the correct set of signatures, and provide analysis of different CPE types as described below with reference to FIG. 5.

Figure 5:
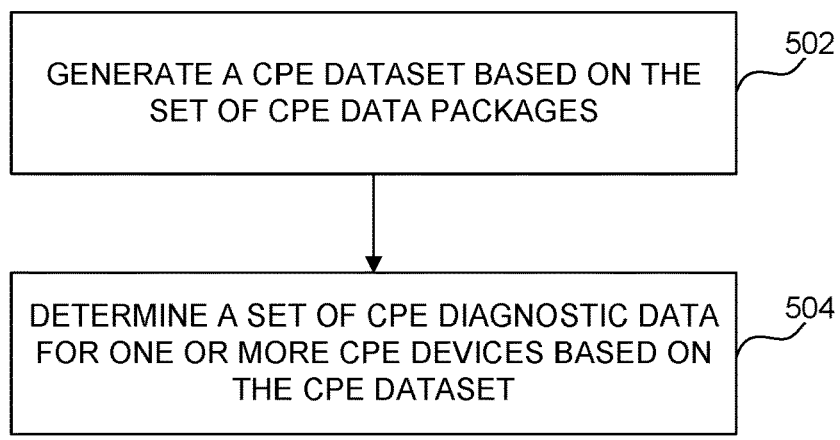
FIG. 5 is a block diagram of another example method for storing and analyzing data collected from CPE devices in a network environment, according to some embodiments.

FIG. 5 is a flowchart for another example method 500 for storing and analyzing data collected from CPE devices in a network environment. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 5, as will be understood by a person of ordinary skill in the art.

Method 500 shall be described with reference to the example embodiment of FIG. 1. However, method 500 is not limited to that example embodiment. For example, method 500 may be described with reference to FIG. 1, FIG. 2, FIG. 3, FIG. 6, or any combination thereof.

At 502, headend device 108 generates a CPE dataset based on a set of CPE data packages, such as the set of CPE data packages received at 410 shown in FIG. 4. In some aspects, once the data collection is complete, headend device 108 can perform data storage and processing with a highly optimized in-memory technique allowing for quick retrieval of data. In some aspects, headend device 108 can first process data from each CPE device individually and then use a combination of back-end systems data (e.g., stored in headend device 108, server device 104, or both) and CPE intrinsic data to differentiate CPE device types and accordingly adjust headend device 108's data digestion mechanism.

At 504, headend device 108 determines a set of CPE diagnostic data for one or more CPE devices in the subset of the set of CPE devices based on the CPE dataset. The set of CPE diagnostic data can include overall connectivity data, outages, customer calls, CPE performance data (e.g., performance characteristics), quality of service (QoS) data, levels-of-user-impact data, data relating to issues and problems, troubleshooting data, issue location data, map data (e.g., topographic map data, heat map data), any other suitable data, and any combinations thereof. In some aspects, the set of CPE diagnostic data can include duration data (e.g., how long an issue persisted).

In some aspects, at 504, headend device 108 can perform a continuous exploration and feedback process to build signatures for detecting an event, such as an issue, a change in profile data, the launching of an app or channel, an action by a remote control, a KPI change status, or any other suitable event. In some aspects, headend device 108 can identify and validate true signatures from customer call logs and testing. In some aspects, headend device 108 can select the key factors needed to determine an event and assign each factor a respective weight. In some aspects, headend device 108 can perform correlational analyses using various data sources for event detection. Over time, these event detection techniques can be evolved to predict one or more events.

In one illustrative and non-limiting example, at 502 and 504, headend device 108 can collect and store the set of CPE data packages as raw data. Subsequently, at 506, headend device 108 can feed the raw data into a data digestion (e.g., digester) process that can make use of functional knowledge, correlations on these sets of raw data, and analytics to prepare reports on individual CPE devices, groups of CPE devices belonging to specific geographical regions, or entire business footprints. As a result, headend device 108 can have substantially complete information of any CPE device in network environment 102 at a given point of time and store that information for any reprocessing that might be needed in future.

Figure 6:
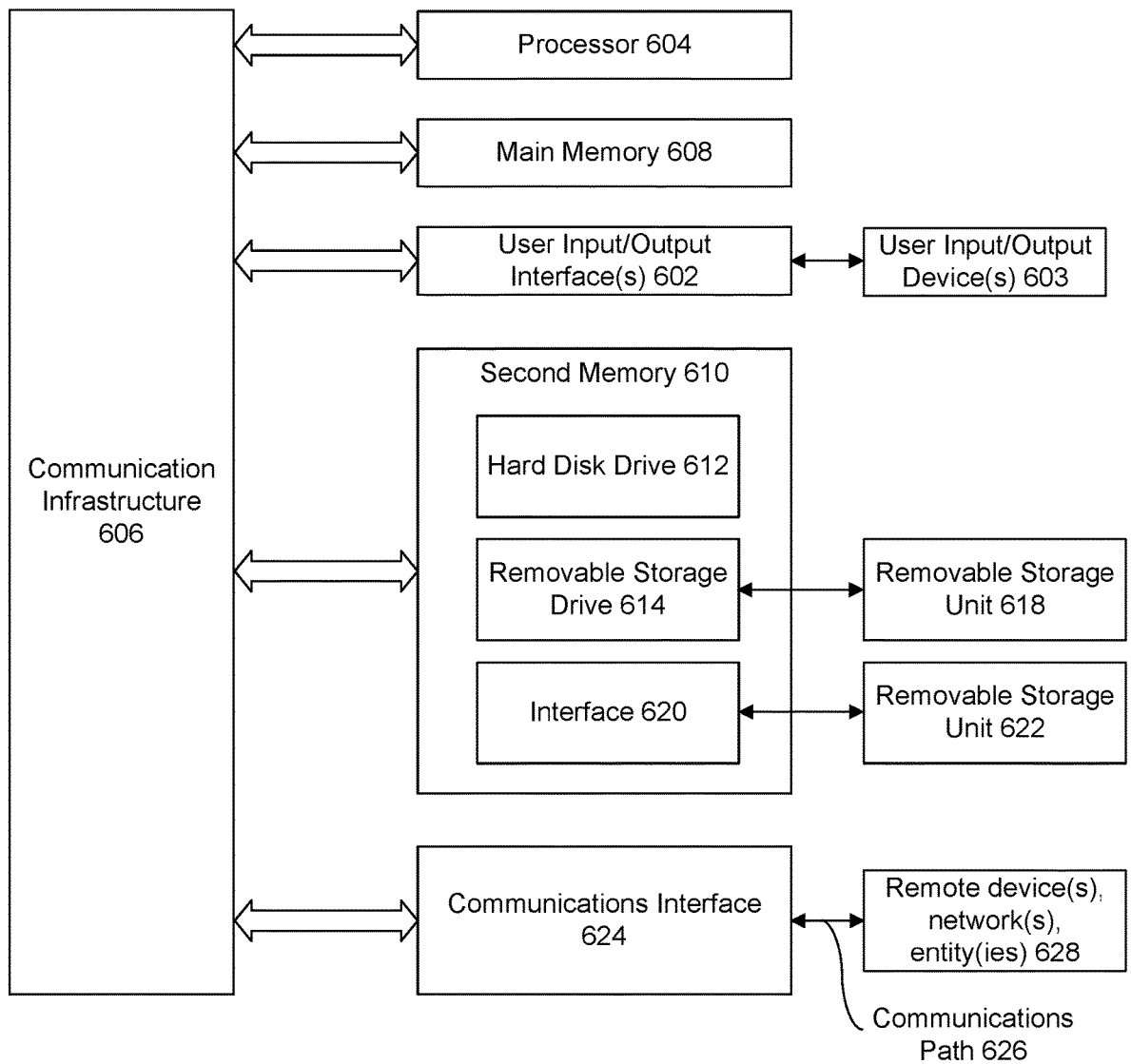
FIG. 6 is an example computer system useful for implementing various embodiments.

Various embodiments may be implemented, for example, using one or more computer systems, such as computer system 600, shown in FIG. 6. Computer system 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer-usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities, or other approaches for allowing computer programs and/or other instructions and/or data to be accessed by computer system 600. Such means, devices, components, instrumentalities, or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

Computer system 600 may be a client or server device, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with various standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all example embodiments as contemplated by the inventor(s), and thus, are not intended to limit this disclosure or the appended claims in any way.

While this disclosure describes example embodiments for example fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments but should be defined only in accordance with the following claims and their equivalents.

What is claimed is:

1. A computer-implemented method, comprising:
   establishing, by a headend device during a first timeframe, a first connection to a customer premise equipment (CPE) device;
   transmitting, by the headend device, a CPE data collection instruction to the CPE device over the first connection;
   terminating, by the headend device, the first connection to the CPE device in response to transmitting the CPE data collection instruction;
   checking, by the headend device, whether a CPE data package that is being generated by the CPE device in response to the CPE data collection instruction is a complete CPE data package that is ready for transmission to the headend device;
   determining, by the headend device in response to an absence of the complete CPE data package, a plurality of second timeframes for establishing a second set of connections to the CPE device to provide a plurality of opportunities for the CPE device to transmit the complete CPE data package to the headend device;
   establishing, by the headend device, the second set of connections to the CPE device during the plurality of second timeframes; and
   receiving, by the headend device, the complete CPE data package from the CPE device over a respective connection from among the second set of connections.

2. The computer-implemented method of claim 1, wherein the CPE device comprises a maximum lossless compression level,
   wherein the complete CPE data package comprises a compressed CPE data package, and
   wherein the compressed CPE data package was compressed by the CPE device at the maximum lossless compression level of the CPE device.

3. The computer-implemented method of claim 1, wherein the plurality of second timeframes for establishing the second set of connections to the CPE device is based on a past performance of the CPE device, a state of the CPE device, or a state of a network environment including the CPE device.

4. The computer-implemented method of claim 1, further comprising determining, by the headend device, a CPE diagnostic data for the CPE device based on the complete CPE data package.

5. The computer-implemented method of claim 4, wherein the CPE diagnostic data comprises overall connectivity data, CPE performance data, quality of service data, a level of user impact data, and troubleshooting data for the CPE device.

6. The computer-implemented method of claim 1, further comprising calculating, by the headend device, average times between adjacent second timeframes from among the plurality of second timeframes based on past CPE performance, a state of the CPE device, and a state of a network environment having the CPE device.

7. The computer-implemented method of claim 6, wherein the calculating comprises calculating the average times in response to the first connection successfully connecting the headend device and the CPE device.

8. The computer-implemented method of claim 1, further comprising utilizing, by the headend device, the complete CPE data package to build a signature for detecting an event that occurred at the CPE device.

9. The computer-implemented method of claim 8, wherein the event comprises an issue, a change in profile data, a launching of an application or a channel, an action by a remote control, or a key performance indicator (KPI) change status.

10. A headend device, comprising:
a memory configured to store a customer premise equipment (CPE) data collection instruction; and
at least one processor configured to execute instructions stored in the memory, the instructions, when executed by the at least one processor, configuring the at least one processor to:
establish, during a first timeframe, a first connection to a CPE device;
transmit a CPE data collection instruction to the CPE device over the first connection;
terminate the first connection to the CPE device in response to transmitting the CPE data collection instruction;
check whether a CPE data package that is being generated by the CPE device in response to the CPE data collection instruction is a complete CPE data package that is ready for transmission to the headend device;
determine, in response to an absence of the complete CPE data package, a plurality of second timeframes for establishing a second set of connections to the CPE device to provide a plurality of opportunities for the CPE device to transmit the complete CPE data package to the headend device;
establish the second set of connections to the CPE device during the plurality of second timeframes; and
receive the complete CPE data package from the CPE device over a respective connection from among the second set of connections.

11. The headend device of claim 10, wherein the CPE device comprises a maximum lossless compression level,
wherein the complete CPE data package comprises a compressed CPE data package, and
wherein the compressed CPE data package was compressed by the CPE device at the maximum lossless compression level of the CPE device.

12. The headend device of claim 10, wherein the plurality of second timeframes for establishing the second set of connections to the CPE device is based on a past performance of the CPE device, a state of the CPE device, or a state of a network environment including the CPE device.

13. The headend device of claim 10, wherein the instructions, when executed by the at least one processor, further configure the at least one processor to determine a CPE diagnostic data for the CPE device based on the complete CPE data package.

14. The headend device of claim 13, wherein the CPE diagnostic data comprises overall connectivity data, CPE performance data, quality of service data, a level of user impact data, and troubleshooting data.

15. The headend device of claim 10, wherein the instructions, when executed by the at least one processor, further configure the at least one processor to calculate average times between adjacent second timeframes from among the plurality of second timeframes based on past CPE performance, a state of the CPE device, and a state of a network environment having the CPE device.

16. The headend device of claim 15, wherein the instructions, when executed by the at least one processor, configure the at least one processor to calculate the average times in response to the first connection successfully connecting the headend device and the CPE device.

17. The headend device of claim 10, wherein the instructions, when executed by the at least one processor, further configure the at least one processor to utilize the complete CPE data package to build a signature for detecting an event that occurred at the CPE device.

18. The headend device of claim 17, wherein the event comprises an issue, a change in profile data, a launching of an application or a channel, an action by a remote control, or a key performance indicator (KPI) change status.

19. A non-transitory computer-readable device having instructions stored thereon that, when executed by a headend device, causes the headend device to perform operations, the operations comprising:
establishing, during a first timeframe, a first connection to a customer premise equipment (CPE) device;
transmitting a CPE data collection instruction to the CPE device over the first connection;
terminating the first connection to the CPE device in response to transmitting the CPE data collection instruction;
checking whether a CPE data package that is being generated by the CPE device in response to the CPE data collection instruction is a complete CPE data package that is ready for transmission to the headend device;
determining, in response to an absence of the complete CPE data package, a plurality of second timeframes for establishing a second set of connections to the CPE device to provide a plurality of opportunities for the CPE device to transmit the complete CPE data package to the headend device;
establishing the second set of connections to the CPE device during the plurality of second timeframes; and
receiving the complete CPE data package from the CPE device over a respective connection from among the second set of connections.

20. The non-transitory computer-readable device of claim 19, wherein the CPE device comprises a maximum lossless compression level,
wherein the complete CPE data package comprises a compressed CPE data package, and
wherein the compressed CPE data package was compressed by the CPE device at the maximum lossless compression level.

21. The non-transitory computer-readable device of claim 19, wherein the plurality of second timeframes for establishing the second set of connections to the CPE device is based on a past performance of the CPE device, a state of the CPE device, or a state of a network environment including the CPE device.

22. The non-transitory computer-readable device of claim 19, wherein the operations further comprise determining a CPE diagnostic data for the CPE device based on the complete CPE data package.

23. The non-transitory computer-readable device of claim 22, wherein the CPE diagnostic data comprises overall connectivity data, CPE performance data, quality of service data, a level of user impact data, and troubleshooting data for the CPE device.

24. The non-transitory computer-readable device of claim 19, wherein the operations further comprise calculating average times between adjacent second timeframes from among the plurality of second timeframes based on past CPE performance, a state of the CPE device, and a state of a network environment having the CPE device.

25. The non-transitory computer-readable device of claim 24, wherein the calculating comprises calculating the average times in response to the first connection successfully connecting the headend device and the CPE device.

26. The non-transitory computer-readable device of claim 19, wherein the operations further comprise utilizing the complete CPE data package to build a signature for detecting an event that occurred at the CPE device.

27. The non-transitory computer-readable device of claim 26, wherein the event comprises an issue, a change in profile data, a launching of an application or a channel, an action by a remote control, or a key performance indicator (CPD) change status.

* * * * *

UNITED STATES PATENT AND TRADEMARK OFFICE
CERTIFICATE OF CORRECTION

PATENT NO. : 11,706,468 B1  
APPLICATION NO. : 17/139654  
DATED : July 18, 2023  
INVENTOR(S) : Almeida et al.

Page 1 of 1

It is certified that error appears in the above-identified patent and that said Letters Patent is hereby corrected as shown below:

In the Claims

In Column 19, Claim 27, Line 21, delete "(CPD)" and insert -- (KPI) --, therefor.

Signed and Sealed this  
Twenty-ninth Day of August, 2023

Katherine Kelly Vidal  
*Director of the United States Patent and Trademark Office*